E. B. Beach,

Self-centering Chuck,

No. 2,104, Reissued Nov. 14, 1865

Witnesses:
H D Hatch
H A Kline

Inventors:
Geo H & John S Clark
by their Atty
John E Earle

UNITED STATES PATENT OFFICE.

GEORGE H. CLARK AND JOHN T. CLARK, OF MERIDEN, CONNECTICU, TASSIGNEES BY MESNE ASSIGNMENTS, OF EDGAR B. BEACH.

IMPROVEMENT IN SELF-CENTERING CHUCKS.

Specification forming part of Letters Patent No. 44,067, dated September 6, 1864; Reissue No. 2,104, dated November 14, 1865.

*To all whom it may concern:*

Be it known that EDGAR B. BEACH, of West Meriden, in the county of New Haven and State of Connecticut, did invent a certain new and Improved Self-Centering Chuck, for which he did obtain Letters Patent of the United States bearing date the 6th day of September, 1864, the entire right and title to which Letters Patent have been and are vested in us, GEORGE H. CLARK and JOHN T. CLARK, of West Meriden aforesaid; and we do hereby declare the following to be a full, clear, and exact description of the said invention, reference being had to the accompanying drawings, and to the letters of reference marked thereon, in which—

Figure 1:
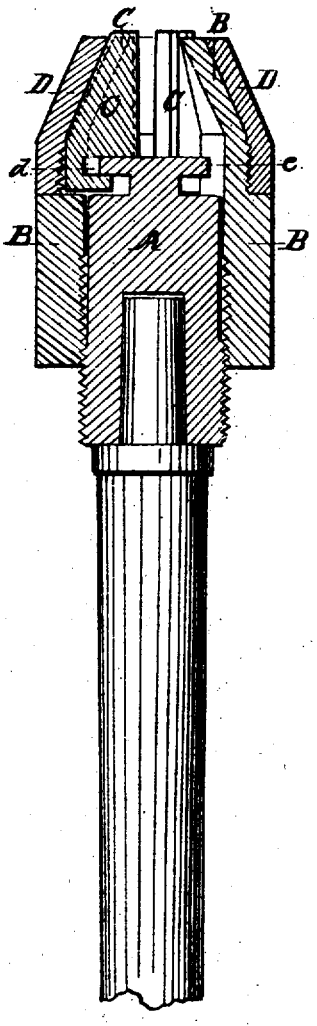
Figure 2:
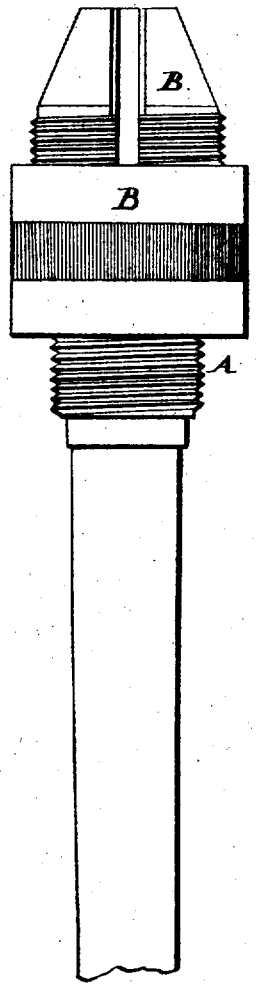
Figure 3:
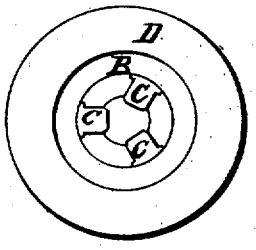
Figure 4:
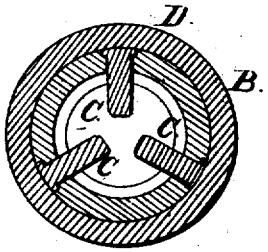
Figure 5:
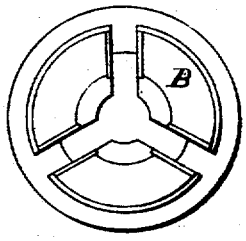

Figure 1 is a section through the axis of a chuck in which the invention is embodied. Fig. 2 is a side elevation of the same with the cap D and jaws C removed. Fig. 3 shows an end view of the chuck. Fig. 4 is a cross-section at X X, Fig. 1, and Fig. 5 is an end view of the parts represented in Fig. 2.

The principal feature of this invention relates to that class of adjustable self-centering chucks called "universal," in which the tool or other article to be held is gripped between two, three, or more jaws, to which simultaneous movements in and out, to and from the axis of the chuck, may be given by the turning of a shell, ring, plate, or other movable part the axis of motion of which is in the axis of the chuck—as examples of which class may be mentioned drill-chucks of the ordinary form, and the common well-known "scroll-chuck."

A serious difficulty experienced in the use of the ordinary forms of chucks aforesaid is that, by undue or irregular twisting-strains the article held is liable to become loosened in the grip of the jaws and is insufficiently held.

It is the object of the leading feature of the aforesaid invention to overcome this objection; and to this end the said leading feature consists in so connecting the movable jaws with that part of the chuck by the turning of which the movements of the jaws are produced, that a tendency to twist any article held in the jaws will tend also to turn the said part of the chuck by which the jaws are closed, and thereby cause the said jaws to grasp the article tighter and prevent its displacement, substantially as hereinafter clearly set forth.

The remaining part of the invention consists in a peculiar construction and combination of certain parts of a self-centering chuck, substantially as hereinafter clearly described and specified, whereby more accurate positive movements are given to the jaws both in opening and closing than in chucks of the usual construction.

To enable others skilled in the art to make and use the invention, we will proceed to a description thereof in its application to a chuck, which, made in the proportions indicated, is particularly adapted for holding drills, reamers, or taps, or for holding small articles to be turned or drilled in a lathe.

In the accompanying drawings, making part of this specification, A is a cylindrical hub, the rear end of which is bored out to fit on the end of a tapering plug, which may be inserted in the spindle of a lathe or drilling-machine; or the hub may be secured to the spindle in any other suitable way which will insure the accurate coincidence of its axis with that of the spindle. The hub A has a spiral thread or male screw formed upon its rear part, the front part being made straight and truly cylindrical, to serve, in connection with the threaded part, as an accurate guide for the shell B, which fits the said hub and has at its rear end an internal screw-thread, which fits the male thread on A. The front part of the shell B is of conical form, and is cut through in three places, to form parallel-sided guideways for the three jaws C. These guideways point to the axis of the chuck, and are made wide at the periphery of the cone, which wider parts form recesses in the conical surface, as shown in the drawings. The bottoms of these recesses are parallel with the adjacent conical surface. The jaws C have parallel sides and fit the guideways in B. They are provided on the back or outer edges with wings or shoulders, which fit the wide parts or recesses of the guideways. These jaws are so shaped that, when inserted from the outside into the guideways, their outer edges slant so as to correspond with and be even with the conical surface of B, while their inner edges are parallel with the axis of the chuck.

D is a conical cap, the internal surface of which corresponds to and fits the conical part of A, to which it is secured by a screw-thread, as shown in Fig. 1. This cap confines the jaws in their guideways in such a way that when the shell B, with the cap D secured thereon, is moved longitudinally forward and back relatively to the jaws C the latter are opened and closed to and from the axis of the chuck with positive movements, their inner edges constantly maintaining parallelism with the said axis. The jaws C are provided with deep notches *d*, which catch onto a disk or collar, *e*, secured to and projecting from the front part of the hub A. These prevent any longitudinal movement of the jaws.

When the chuck is to be used in a lathe of ordinary construction, or in a drill-press, the spindles of which turn in the usual direction, the screw-thread upon A should be made "right-handed;" but if it be required to use the chuck with a spindle having a left-hand or backward movement of revolution, suitable for left-hand drills, then the screw on A should have a left-hand thread.

The chuck shown in the drawings is of the former description, and we will now proceed to describe its operation and use. The jaws are opened by turning the shell B backward, and thus unscrewing it on the hub A. The drill or other article to be held in the chuck is inserted between the jaws and the shell B, is grasped by the hand or with a wrench, and is turned to the right or forward, which screws it further onto the hub A, whereby the said shell is forced farther onto the jaws C, and these are thereby, in the manner already described, caused to close and grip the article between them, holding it truly in coincidence with the axis of the chuck. When a drill thus held is at work, the resistance to its cutting will tend to cause it to turn within the grasp of the jaws; but this will be prevented by the resulting tendency to turn the shell B (which contains the jaws) relatively to the hub A, whereby the shell would be screwed farther onto the hub, and thereby increase the grip of the jaws upon the drill. The same result occurs when the chuck is used to hold any article to be turned or bored in a lathe, the resistance of the cutting-tool occasioning a tightening of the hold of the jaws on the work.

The advantages of constructing the recessed guideways in the shell B, as described, and the use of the conical cap D therewith, are that the jaws may thereby be forcibly pulled open as well as forced together, thus obviating the objectionable use of springs to throw out the jaws. The jaws are thus accurately guided and their exact centering secured in all positions.

The construction of the instrument is simple.

Although we have represented this invention in its application to a chuck for small work, yet it is obvious that by altering its proportions it may be adapted for more general use; and although we have described the leading feature, as hereinbefore specified, of the invention as applied to the chuck herein-before particularly described, (wherein the jaws are closed by a conical surface,) yet we do not wish to be understood to limit our claim to this application of the said feature which may with advantage be applied to many forms of chucks which otherwise may differ from the one represented in our drawings and above referred to.

What we claim as the invention of EDGAR B. BEACH aforesaid, and desire to secure by Letters Patent of the United States, is—

1. Forming the guides for the longitudinally-sliding jaws in that part of the chuck by the turning of which the closing of the jaws is produced, substantially in the manner herein set forth.

2. The inclined converging guideways *e*, in combination with the jaws C, head D, and screw-spindle A, constructed and operating in the manner and for the purpose substantially as herein shown and described.

GEORGE H. CLARK,
JOHN T. CLARK,

*Assignees, by mesne assignmentss of Edgar B. Beach.*

Witnesses:
E. H. LOOMIS,
J. F. KIRTLAND.